Figure 1:
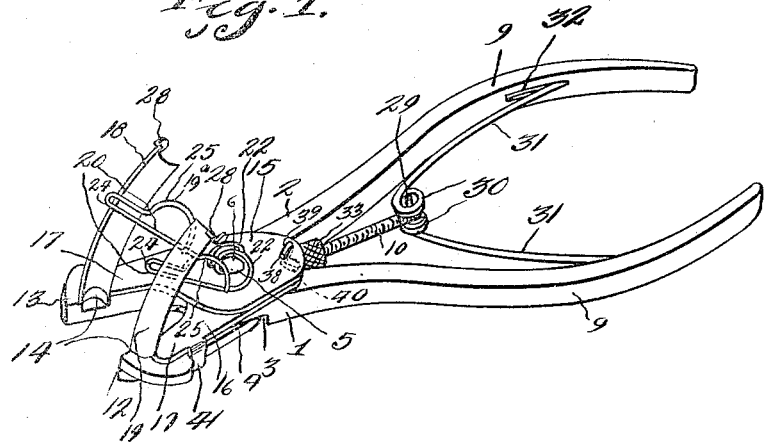

W. L. McGOWAN.
HOG RINGER.
APPLICATION FILED APR. 5, 1916.

1,204,045.

Patented Nov. 7, 1916.
2 SHEETS—SHEET 1.

Witnesses
Philip Terrell
Frances J. Connell

Inventor
W. L. McGowan

By D. Swift & Co.
Attorneys

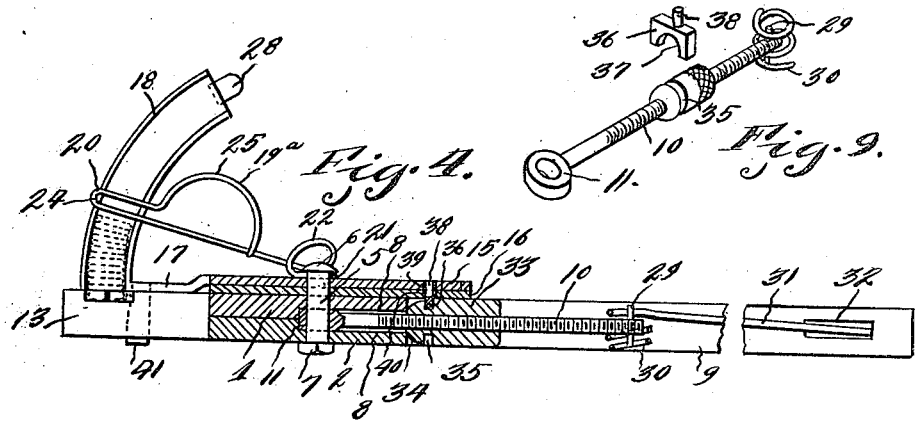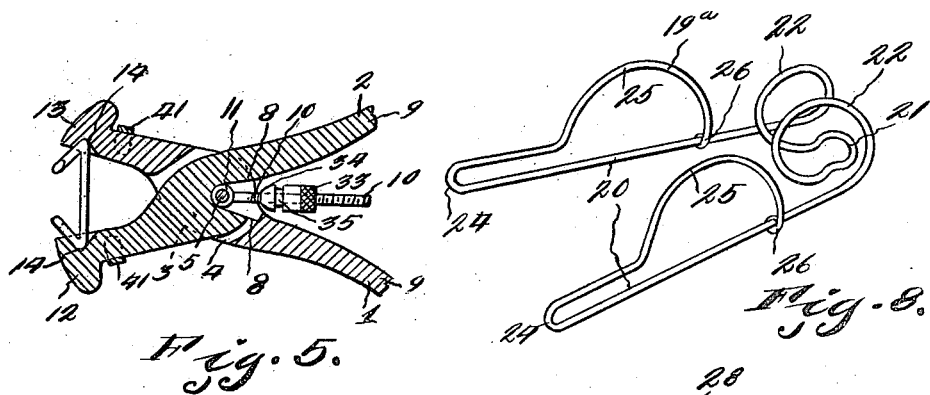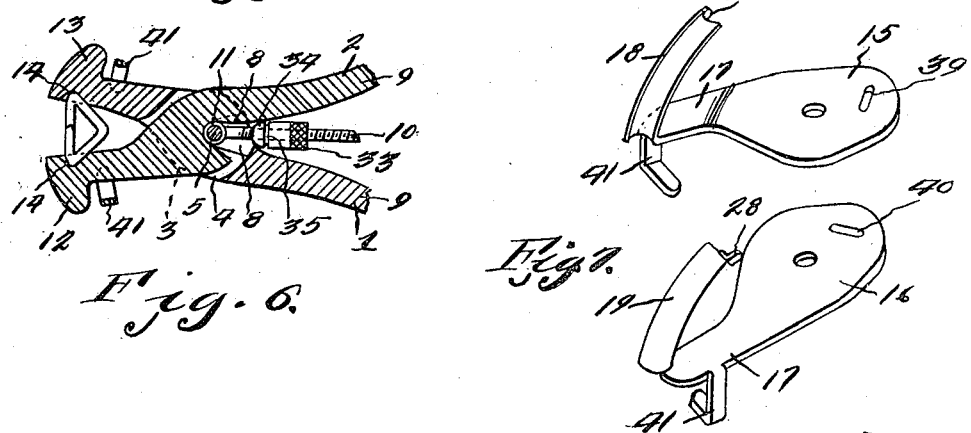

UNITED STATES PATENT OFFICE.

WILLIAM L. McGOWAN, OF GALT, MISSOURI.

HOG-RINGER.

1,204,045.  Specification of Letters Patent.  Patented Nov. 7, 1916.

Application filed April 5, 1916. Serial No. 89,101.

*To all whom it may concern:*

Be it known that I, WILLIAM L. McGOWAN, a citizen of the United States, residing at Galt, in the county of Grundy, State of Missouri, have invented a new and useful Hog-Ringer; and I do hereby declare the following to be a full, clear, and exact description of the invention, such as will enable others skilled in the art to which it appertains to make and use the same.

This invention relates to an improved hog ringer, and one of the objects of the invention is to improve, simplify and render more practical the structure shown, set forth and claimed in the patent to William L. McGowan, issued April 20, 1915, Patent No. 1,136,149.

Another object of the invention is the provision of magazine jaws, and means for adjusting said magazine jaws, whereby different sized hog rings may be held therein, so as to enable the same hog ringer device to be used when ringing pigs or shoats, as when ringing hogs.

Another object of the invention is the provision of means on the magazine jaws, to coöperate with the clenching jaws, to limit the clenching jaws in their open positions, correspondingly to the size of ring supported in the magazine jaws.

Another object of the invention is the provision of spring means to bear down upon the rings in the magazine jaws, to hold them in place.

In practical fields the details of construction may necessitate alterations, falling within the scope of what is claimed.

The invention comprises further features and combination of parts, as hereinafter set forth, shown in the drawings and claimed.

Figure 2:
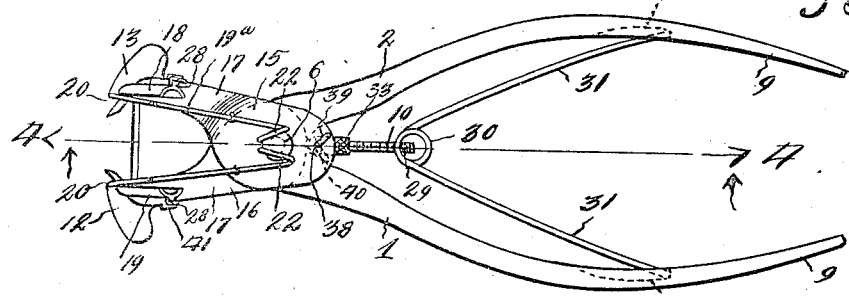
Figure 3:
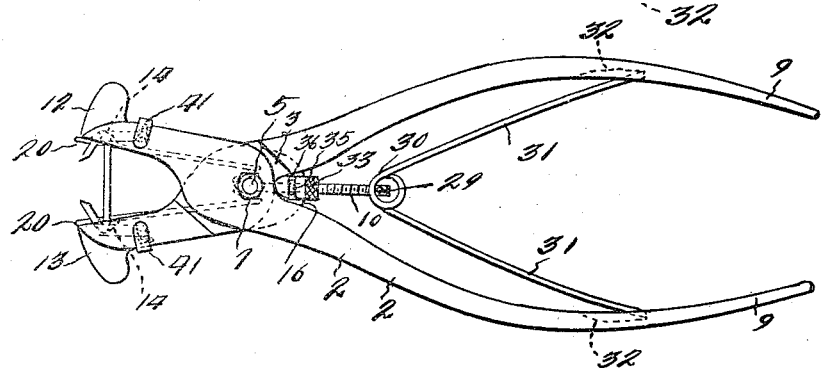

In the drawings: Figure 1 is a view in perspective of the improved hog ringer constructed in accordance with the invention. Fig. 2 is a top plan view, showing a ring ready to be clenched by the clenching jaws. Fig. 5 is a bottom plan view of Fig. 2. Fig. 4 is a sectional view on line 4—4 of Fig. 2. Fig. 5 is a sectional view through the clenching jaws. Fig. 6 is a view similar to Fig. 5, showing the ring having been clenched. Fig. 7 illustrates detail perspective views of the magazine jaws. Fig. 8 is a detail perspective view of the spring devices or arms for holding the ring in the magazine jaws. Fig. 9 is a detail perspective view of the means for adjusting the magazine jaws.

Referring more especially to the drawings, 1 and 2 designate a pair of crossing members, the adjacent faces of which where the members cross, are recessed as shown at 3 and 4, so that the upper and lower faces of said members are flush with each other. A suitable pivot pin 5 having a head 6 at one end and a threaded nut 7 at the other, is used for pivotally uniting said members. The adjacent faces of the recesses 3 and 4 are provided with auxiliary recesses 8 extending backwardly from the pivot pin 5 in a plane toward and between the handles 9 of said members 1 and 2. A screw 10 has its eye 11 mounted upon the pivot pin 5, the screw 10 extending through the auxiliary recesses 8. The forward portions of the members 1 and 2 terminate in clenching jaws 12 and 13, the adjacent faces of which near their extremities are provided with recesses or pockets 14, for the reception of the opposite looped ends of one of the rings. Pivotally mounted upon the pin 5 beneath its head 6 is a pair of plates 15 and 16. The forward end portion 17 of said plates 15 and 16 are provided with laterally extending curved channel arms, or magazine jaws 18 and 19, in the channels of which a plurality of hog rings may be arranged. A spring device 19$^a$ comprising the arms 20 is arranged upon the pivot pin 5 beneath its head 6, so that said spring arms 20 will bear down upon the upper or outermost hog rings, so as to hold said rings in place, and to cause them to feed into the recesses or pockets 14, as the hog rings one at a time, are used. This spring device is constructed from a single length of spring wire material, bent substantially midway its ends to form the eye or loop 21, through which the pivot pin 5 extends. The wire material beyond the eye or loop 21 is bent to form the two spring coils or loops 22, which are arranged laterally to the loop or eye 21. The spring wire beyond the coils or loops 22 form spring arms 20, bent as shown to form the loops 24, beyond which, the spring wire is arched as shown at 25. The end portions of the arches 25 are attached at 26 to the spring arms 20.

The outer or lateral terminals of the magazine jaws are provided with angular lugs 28, to be engaged by the spring arms 20, while the magazine jaws are being filled with hog rings. After the magazine jaws are filled, the spring arms may be disengaged from the angular lugs 28 and allowed to bear upon the hog rings. In this case the hog rings are gradually fed, as the hog rings one at a time, are utilized. The rear end of the screw 10 is provided with a transverse pin 28ª, to be engaged by the spring coils 30, from which the spring arms 31 extend. The spring arms 31 have their extremities engaging elongated recesses 32 in the adjacent faces of the handle ends 9 of said members 1 and 2. A sleeve 33 is threaded upon the screw 10, and has its forward rounded end 34 engaging the crotch, adjacent and between the members 1 and 2, that is, the crotch where the members 1 and 2 cross. The sleeve 33 has an annular groove 35, and a plate 36 having the semi-circular recess 37 arches the sleeve 33, so that the plate 36 engages the groove 35. The plate 36 is provided with a small pin or lug 38, which extends through the slots 39 and 40 of the plates 15 and 16. The slots 39 and 40 extend at opposite angles to each other, so that by adjusting the sleeve in one direction or the other upon the screw 10, the plates 15 and 16 will be adjusted pivotally upon the pin 5, whereby the magazine jaws are adjusted toward and from each other, in order to accommodate rings of different sizes. In other words, by adjusting the sleeve 33 the magazine jaws may be adjusted toward each other, so as to accommodate a series of nose rings of one size, and by separating the magazine jaws farther apart, a series of rings of a larger size may be supported in the magazine jaws. The plates 15 and 16 adjacent the magazine jaws (which register with the pockets or recesses 14 of the jaws 12 and 13 when open) are provided with laterally depending lugs 41, which are angular and extend under the jaws 12 and 13, thereby limiting the jaws 12 and 13 in their open positions, regardless of the positions assumed by the magazine jaws, so that no matter what size ring is carried in the magazine jaws, the pockets or recesses 14 will always register with the channels of the magazine jaws, when the jaws 12 and 13 are open. It is to be noted that after pressing the handle end 9 of the members 1 and 2 together, so that the jaws 12 and 13 will clench a ring, the spring arm 31 will open the handle end, and the jaws 12 and 13.

The invention having been set forth, what is claimed as new and useful is:

1. In a hog ringer as set forth, a pair of members crossing each other, a pivot pin pivotally uniting said members at their crossing point, said members having clenching jaws provided with clenching pockets forward of their pivot and terminating rearwardly in operating handles, a pair of plates pivoted flatwise one upon the other upon the pivot pin and terminating at their forward ends in curved channeled magazine jaws, said plates having means to limit the jaws so that the pockets will register with the magazine jaws when the clenching jaws are opened, a screw on the pivot pin, and a member on the screw having connections with said plates for adjusting the same, whereby the magazine jaws may accommodate hog rings of different sizes.

2. In a hog ringer as set forth, a pair of members crossing each other, a pivot pin pivotally uniting said members at their crossing point, said members having clenching jaws provided with clenching pockets forward of their pivot and terminating rearwardly in operating handles, a pair of plates pivoted flatwise one upon the other upon the pivot pin and terminating at their forward ends in curved channeled magazine jaws, said plates having means to limit the jaws so that the pockets will register with the magazine jaws when the clenching jaws are opened, a screw on the pivot pin, and a member on the screw having connections with said plates for adjusting the same, whereby the magazine jaws may accommodate hog rings of different sizes, and a spring device having spring arms mounted upon the pivot pin and designed to bear upon a plurality of hog rings mounted in the magazine jaws.

3. In a hog ringer as set forth, a pair of members crossing each other, a pivot pin pivotally uniting said members at their crossing point, said members having clenching jaws provided with clenching pockets forward of their pivot and terminating rearwardly in operating handles, a pair of plates pivoted flatwise one upon the other upon the pivot pin and terminating at their forward ends in curved channeled magazine jaws, said plates having means to limit the jaws so that the pockets will register with the magazine jaws when the clenching jaws are opened, a screw on the pivot pin, and a member on the screw having connections with said plates for adjusting the same, whereby the magazine jaws may accommodate hog rings of different sizes, and a spring device having spring arms mounted upon the pivot pin and designed to bear upon a plurality of hog rings mounted in the magazine jaws, the lateral extremities of the magazine jaws having lugs to be engaged by the spring arms of the spring device to hold the spring arms out of the way while inserting a plurality of hog rings in magazine jaws.

4. In a hog ringer as set forth, a pair of members crossing each other, a pivot pin pivotally uniting said members at their crossing point, said members having clenching jaws provided with clenching pockets forward of their pivot and terminating rearwardly in operating handles, a pair of plates pivoted flatwise one upon the other upon the pivot pin and terminating at their forward ends in curved channeled magazine jaws, said plates having means to limit the jaws so that the pockets will register with the magazine jaws when the clenching jaws are opened, a screw on the pivot pin, a sleeve threaded on the screw and provided with an annular groove, and a plate arching in said groove and connected to said first named plates for adjusting the same, whereby the magazine jaws may accommodate hog rings of different sizes.

5. In a hog ringer as set forth, a pair of members crossing each other, a pivot pin pivotally uniting said members at their crossing point, said members having clenching jaws provided with clenching pockets forward of their pivot and terminating rearwardly in operating handles, a pair of plates pivoted flatwise one upon the other upon the pivot pin and terminating at their forward ends in curved channeled magazine jaws, a screw on the pivot pin, a sleeve threaded on the screw and provided with an annular groove, a plate arching in said groove and connected to said first named plates for adjusting the same, whereby the magazine jaws may accommodate hog rings of different sizes, said plates having laterally depending angular arms for limiting the clenching jaws correspondingly to the adjustment of the magazine jaws, whereby the pockets, when the clenching jaws are open, will register with the channels of the magazine jaws.

6. In a hog ringer as set forth, a pair of members crossing each other, a pivot pin pivotally uniting said members at their crossing point, said members having clenching jaws provided with clenching pockets forward of their pivot and terminating rearwardly in operating handles, a pair of plates pivoted flatwise one upon the other upon the pivot pin and terminating at their forward ends in curved channeled magazine jaws, a screw on the pivot pin, a sleeve threaded on the screw and provided with an annular groove, a plate arching in said groove and connected to said first named plates for adjusting the same, whereby the magazine jaws may accommodate hog rings of different sizes, said plates having laterally depending angular arms for limiting the clenching jaws correspondingly to the adjustment of the magazine jaws, whereby the pockets, when the clenching jaws are open, will register with the channels of the magazine jaws, and a spring device having spring arms mounted upon the pivot to hold a plurality of hog rings in the magazine jaws.

In testimony whereof I have signed my name to this specification in the presence of two subscribing witnesses.

WILLIAM L. McGOWAN.

Witnesses:
W. R. BOYD,
H. S. COOK.

Copies of this patent may be obtained for five cents each, by addressing the "Commissioner of Patents, Washington, D. C."